(12) United States Patent
White et al.

(10) Patent No.: US 11,494,378 B2
(45) Date of Patent: Nov. 8, 2022

(54) RUNTIME OPTIMIZATION OF GROUPING OPERATORS

(71) Applicant: salesforce.com, inc., San Francisco, CA (US)

(72) Inventors: Seth White, San Francisco, CA (US); Guillaume Le Stum, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 181 days.

(21) Appl. No.: 16/425,808

(22) Filed: May 29, 2019

(65) Prior Publication Data

US 2019/0384765 A1    Dec. 19, 2019

Related U.S. Application Data

(60) Provisional application No. 62/687,201, filed on Jun. 19, 2018.

(51) Int. Cl.
*G06F 16/24* (2019.01)
*G06F 16/2453* (2019.01)

(52) U.S. Cl.
CPC .......... *G06F 16/24537* (2019.01); *G06F 16/24545* (2019.01); *G06F 16/24549* (2019.01)

(58) Field of Classification Search
CPC .............................................. G06F 16/24537
USPC .................................................. 707/719
See application file for complete search history.

(56) References Cited

U.S. PATENT DOCUMENTS

| 5,577,188 | A  | 11/1996 | Zhu |
| 5,608,872 | A  | 3/1997 | Schwartz |
| 5,649,104 | A  | 7/1997 | Carleton |
| 5,715,450 | A  | 2/1998 | Ambrose et al. |
| 5,761,419 | A  | 6/1998 | Schwartz |
| 5,819,038 | A  | 10/1998 | Carleton |
| 5,821,937 | A  | 10/1998 | Tonelli et al. |
| 5,831,610 | A  | 11/1998 | Tonelli et al. |
| 5,873,096 | A  | 2/1999 | Lim et al. |
| 5,918,159 | A  | 6/1999 | Fomukong et al. |
| 5,963,953 | A  | 10/1999 | Cram et al. |
| 6,092,083 | A  | 7/2000 | Brodersen et al. |
| 6,161,149 | A  | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |

(Continued)

*Primary Examiner* — Syling Yen
(74) *Attorney, Agent, or Firm* — Dergosits & Noah LLP; Todd A. Noah

(57) ABSTRACT

Runtime optimization of grouping operators is described. A system estimates a resource cost for each of multiple grouping operators based on values identified during query runtime, in response to receiving a query request associated with a data stream. The system selects a grouping operator during query runtime, based on a corresponding resource cost, from the multiple grouping operators. The selected grouping operator enables grouping the data stream based on the query request, and outputting a response based on the grouped data stream.

20 Claims, 3 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0086039 A1* | 4/2013 | Salch .................. G06F 16/183 |
| | | 707/717 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0370883 A1* | 12/2015 | Kalki ................ G06F 21/6236 |
| | | 707/600 |
| 2017/0060769 A1* | 3/2017 | Wires ................ H04L 12/6418 |
| 2017/0357708 A1* | 12/2017 | Ramachandran ..... G06F 16/283 |
| 2018/0018375 A1* | 1/2018 | Brunel ................ G06F 16/284 |
| 2018/0336247 A1* | 11/2018 | Ignatyev .......... G06F 16/24542 |
| 2019/0220464 A1* | 7/2019 | Butani ............. G06F 16/24542 |

* cited by examiner

RUNTIME OPTIMIZATION OF GROUPING OPERATORS

CROSS REFERENCE TO RELATED APPLICATION

This application claims priority under 35 U.S.C. § 119 or the Paris Convention from U.S. Provisional Patent Application 62/687,201, filed Jun. 19, 2018, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Relational database systems have traditionally performed query optimization during query compilation, prior to the beginning of query execution. A query optimizer can explore a set of alternative query plans, and use database statistics to evaluate these plans to estimate which plan will have the lowest runtime cost, such as the fewest operations executed. Alternatively, some database systems delay certain optimization decisions until the query is executing, which may be referred to as query runtime. This late optimization approach has the advantage that the results of the partially executed query may be used to make more informed optimization decisions based on the actual data being queried rather than basing decisions on statistical estimates which may be inaccurate. The database research community has explored various types of the late optimization approach to an extent, and some commercial database systems have implemented types of the late optimization approach.

BRIEF SUMMARY

A query engine is a system that responds to an information request by retrieving information stored on a computer system, and then presenting the retrieved information. A query engine can include a query optimizer that can use a specific set of late optimizations to optimize grouping operators at runtime. Grouping is a common operation which is required by many queries. Although the following examples use the inverted data format that is the native data format of columnar storage systems, embodiments of the present disclosure are not limited to using only columnar storage systems and may use row-based storage systems as well. The general form of a grouping operator is that it is an operator that takes a single stream of inverted data as its input and refines the existing grouping of that stream by adding one additional level of grouping. To achieve high-performance, a query engine attempts to perform grouping on streams of inverted data prior to row construction, which is late materialization.

A query engine can use different types of grouping operators, such as the cross intersection left operator, which may be referred to as the CrossIsectLeft operator or the XIL operator, and the cross intersection dimension index operator, which may be referred to as the CrossIsectDimIndex operator or the XIDI operator. The XIL operator intersects its incoming stream of inverted data with data in a second stream of inverted data by using a nested-loops algorithm to repeatedly scan the second stream for each element in the first stream. In contrast, the XIDI operator uses a dimension index data structure to optimize the grouping operation. The XIL operator and the XIDI operator have very different system resource costs which are influenced by a number of factors, such as the number of groupings required for output by the operator, the cardinality of the incoming stream, the number of rows associated with each group in the incoming stream, the cardinality of the second stream (for the XIL operator), and the number of rows in the data set.

A query optimizer attempts to select the best grouping operator before execution begins by using traditional estimation techniques combined with optimization during query execution. The query optimizer's runtime grouping optimization considers only child streams which are ultra-flat, which is a child stream that is a single set of rows, which may be referred to as a record set or a RecordSet, which is not grouped. Thus, the input stream contains a single ungrouped inverted element, and the output of the grouping operator is a stream of elements that has a single level of grouping. The advantage of runtime optimization is that since the size and contents of the ungrouped set of rows may be determined at query runtime, a query optimizer does not have to estimate the size and contents of the ungrouped set of rows. The ultra-flat set of rows is typically the output of filter evaluation, and estimating the selectivity of filter predicates is a notoriously inaccurate aspect of traditional, pre-execution database query optimization. The query optimizer uses analytical performance modeling techniques to create a cost formula for the grouping alternatives, which abstracts low-level implementation details. The query optimizer also uses sampling to estimate the cost of intersections that are done using roaring bitmaps.

In accordance with embodiments, there are provided systems and methods for runtime optimization of grouping operators. A system estimates a resource cost for each of multiple grouping operators based on values identified during query runtime, in response to receiving a query request associated with a data stream. The system selects a grouping operator during query runtime, based on a corresponding resource cost, from the multiple grouping operators. The selected grouping operator enables grouping the data stream based on the query request and outputting a response based on the grouped data stream.

For example, a query optimizer receives a query request of a global online retail sales database, in which each row represents a retail sales transaction, for the transactions during the first 10 weeks of the year 2018. The query optimizer uses query runtime values to estimate 1.435 billion operations for the XIL operator and 6.408 billion operations for the XIDI operator. The query optimizer selects the XIL operator during query runtime, based on the lower estimate of 1.435 billion operations. The selected XIL operator optimally groups the data stream from the global online retail sales database, and then outputs the grouped transactions during the first 10 weeks of the year 2018.

While one or more implementations and techniques are described with reference to an embodiment in which runtime optimization of grouping operators is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for runtime optimization of grouping operators. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for runtime optimization of grouping operators will be described with reference to example embodiments. The following detailed description will first describe a method for runtime optimization of grouping operators.

Figure 1:
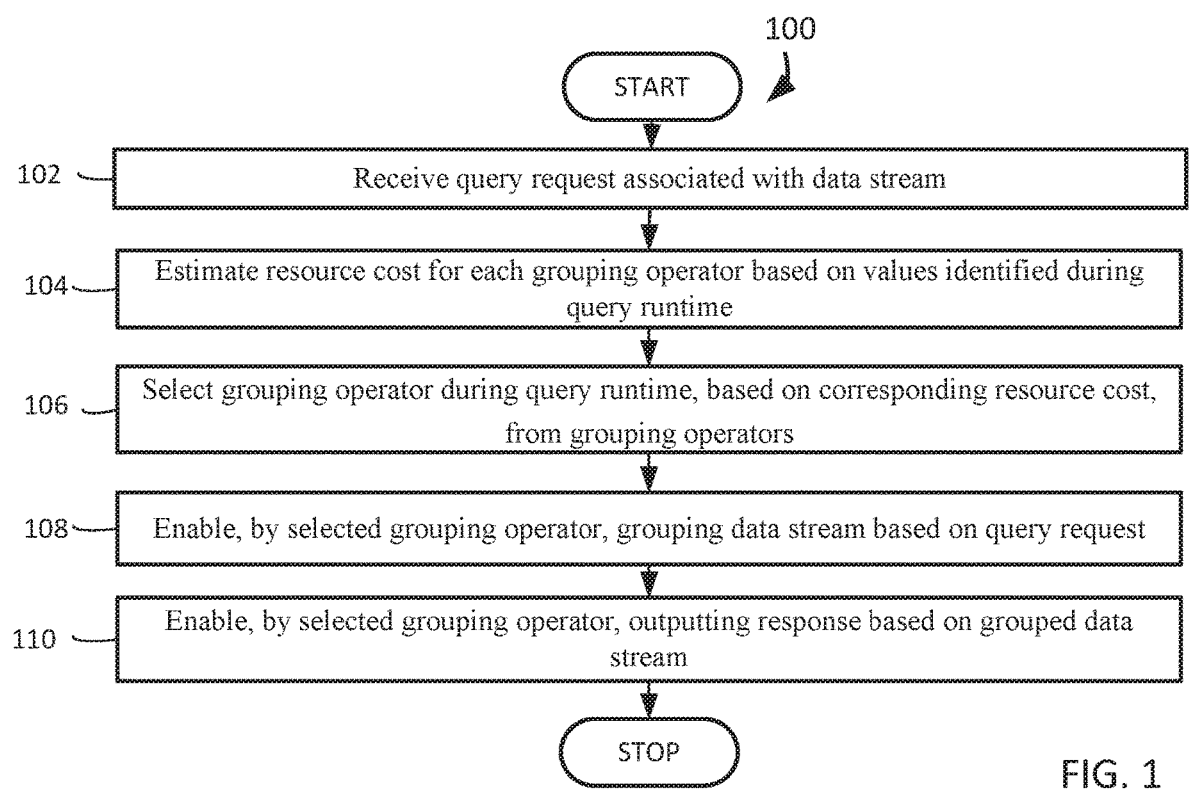
FIG. 1 depicts an operational flow diagram illustrating a high-level overview of a method for runtime optimization of grouping operators, in an embodiment.

FIG. 1 is an operational flow diagram illustrating a high-level overview of a method 100 for runtime optimization of grouping operators. The method 100 may be implemented on either a centralized computing platform or in parallel on a distributed computing platform.

A query request that is associated with a data stream is received, block 102. The system receives a query that will be optimized. For example, and without limitation, this can include a query optimizer receiving a query request of a global online retail sales database, in which each row represents a retail sales transaction, for the transactions during the first 10 weeks of the year 2018. A query request can be a computer instruction to retrieve information. A data stream can be a sequence of digitally encoded coherent signals.

A resource cost is estimated for each of multiple grouping operators based on values identified during query runtime, block 104. The system estimates the number of operations for each grouping operator that may be used. By way of example and without limitation, this can include the query optimizer using query runtime values to estimate 1.435 billion operations for the XIL operator and 6.408 billion operations for the XIDI operator, as described below in detail. A resource cost can be an estimated number of computer operations. A grouping operator can be a function that takes a single stream of inverted data as its input and refines the existing association of that stream by adding one additional level of association. A value can be a numerical amount denoted by an algebraic term; a magnitude, quantity, or number. Query runtime can be when a computer performs at least a part of an information retrieval request.

A query optimizer can estimate the system resources cost of grouping using the XIL operator when the left child of the XIL operator is an ultra-flat set of rows and the right child of the XIL operator is a dimension with a known cardinality. The left child typically represents a set of rows matched by a filter. In the example below, QG.Flatten produces the set of rows that represent the filter expression dim1≥val1 and dim1≤val2, and then a XIL operator groups this set of rows by dim2.

```
QG.Cross_isect_left(
    QG.Flatten (
        QG.Dimension_data("em", "dim1", range(val1, val2))),
    QG.Dimension_data("em", "dim2"))
```

The XIL operator works on streams of inverted data. Each element in an inverted stream is logically a tuple of the form (<grouping values>, <row list>, <projected values>). QG.Flatten produces a single element of the form (nil, [5, 66, 874, 19287, . . . ], nil). In other words, the inverted stream has a list of row numbers, but has no grouping (since the data is flat) and no projected values. Dimension_data produces a stream of elements that are grouped according to the dimension. (val i, [rows i], nil), i=1, . . . card dim.

The XIL operator outputs a stream that looks like: (val 1, [5, 66], nil), (val 2, [874], nil), (val 3, [ . . . ], nil), . . . . Here the set of rows from the left child has been "partitioned" according to the dimension by intersecting the left child element with each element produced by the right child. This output stream could also be expressed as: (val 1, rows left∩rows 1, nil), (val 2, rows left∩rows 2, nil), (val 3, rows left∩rows 3, nil), . . . .

The example query that is represented below is a query of a global online retail sales database in which each row represents a retail sales transaction. The query filters based on the year in which the sale occurred, selecting all sales for the year 2018, groups the selected transactions by week, sums the amount of sales for each week, and returns the results for retail sales transactions during the first 10 weeks of 2018.

q=load "sales";
q=filter q by 'year' in ["2018", "2018"]
q=group q by ('week')
q=for each q generate 'week', sum(amt) as 'tot_sales';
q=limit q 10

The query graph below is an example query graph, which includes a QG.Cross_isect_left (XIL) operator, produced by the query compiler for the example query above.

```
QG.Row_range(
  QG.Rows_agg_inv(
    QG.Map_groups_inv(
      QG.Cross_isect_left(
        QG.Flatten (
          QG.Dimension_data("sales", "year", range("2018", "2018"))),
        QG.Dimension_data("sales", "week"))
```

System resource costs for the XIL grouping operator are represented as a generic number of operations that must be performed by the computer that is executing the query which is being optimized. The input variables that are known at query runtime for estimating the system resources costs include filter set size (filterSetSize), data set size (dsSize), dimension cardinality (dmCard), limit, and downsteam cardinality (downStreamCard). The following variables and values are for the retail sales example. The filterSetSize variable represents the number of rows in the filter set, such as 388,381,289 transactions during 2018. The dsSize variable represents the number of rows in the data set, such as 5,287,987,111 transactions/rows in the database. The dmCard variable represents the number of unique values in the dimension, such as 52 unique weeks. The limit variable represents the maximum number of result rows needed for the query, such as 10 rows needed in the result. The downStreamCard variable represents the product of downstream grouping dimension cardinalities, such as 1. There is only one grouping level for the retail sales example, so a default is used. There is no downstream in effect for this example query, so downstream is not a factor.

The query optimizer determines rows per value based on a data set size and a dimension cardinality. For the continuing retail sales example, the query optimizer calculates the rows per value, which is the expected number of rows for each dimension value, by dividing the data set size by the dimension cardinality, such as rowsPerVal=dsSize/dmCard=5,287,987,111/52=101,692,059.8. Data set size can be the magnitude of a group of information. Dimension cardinality can be the number of unique values in a string-valued column in a table. Rows per value can be the expected number of horizontal lines of entries in a table for each dimension.

Row lists are represented as roaring bitmaps. Roaring represents a bitmap as a set of containers. The number of containers for the left child (leftChild.containerCount) and the container size (containersize) are known at query runtime because the left child has already been evaluated. The query optimizer determines the filter set container count (filterSetContainerCnt) at runtime by examining the computed result of evaluating the filter subtree (QG.Flatten and its children). The filterSetContainerCnt value depends greatly on the physical layout of the database. For the continuing retail sales example, the data is assumed to be physically ordered by date, which is common. The results of the filter evaluation are represented as a roaring bitmap which internally is a sequence of containers. Each container can hold a maximum of 64 k values. The query optimizer determines a filter set container count based on a container size and a number of containers for a left child. For the continuing retail sales example, filterSetContainerCnt=leftChild.containerCount/containersize=388,381,289/65,536=5,926. A filter set container count can be the number of objects that store selected entities. A number of containers for the left child can be the count of objects that store entities for one of two sources of elements. A container size can be the magnitude of an object that stores entities.

The query optimizer uses sampling to estimate a dimension container count (dimContainerCnt) which is the average number of containers for the right child elements. The dimension container count also depends on the physical layout of the data. The query optimizer converts a small number (2% or less) of the dimension values to roaring and samples the converted values. For the continuing retail sales example, dimContainerCnt=sampleDimension(dim2)=101,692,059.8/32,768=3,103, based on the assumption that the 64 k containers are 50% full for this dimension. The dimension container count can be the average number of objects that store entities for the right child elements.

The query optimizer determines a conversion cost based on the rows per value, the dimension container count, a container cardinality, and a run container run count. For the continuing retail sales example, the expected cost for converting a list of rows for a dimension value to a roaring bitmap is the conversion cost (convertCost)=roaringConvertCost (rowsPerVal, dimContainerCnt)=roaringConvertCost (101,692,059.8, 3,103)=101,692,059.8. A conversion cost can be an expected expense for changing a list of rows for a dimension value to a roaring bitmap.

The roaringConvertCost function starts with an estimate for the number of containers, the dimension container count (dimContainerCnt), and the rows per value (rowsPerVal). All of the containers are assumed to have the same type, as the conversion cost for a container is a function of its type. There are three container types: run containers, array containers, and bitmap containers. A run container can be a type of object that stores entities in compact rows. An array container can be a type of object that stores entities in a relatively small number of rows. A bitmap container can be a type of object that stores entities in a relatively large number of rows.

The roaringConvertCost function includes the query optimizer determinngs a container cardinality, which is the average number of rows per container, based on the rows per value and the dimension container count, by dividing the rows per value by the dimension container count. For the continuing retail sales example, the container cardinality (containerCard)=rowsPerVal/dimContainerCnt=101,692,059.8/3,103=32,772. A container cardinality can be the average number of rows per object that stores entities.

The roaringConvertCost function includes the query optimizer determining whether run containers are being used, based on the container cardinality. The query optimizer will use run containers if the rows in a roaring bitmap are very compact, which results in sequential/contiguous runs of rows in the container. The query optimizer will use run containers if the containers are at least 85% full. The maximum number of rows in a container (MaxCard) is 65,536, which is determined by the roaring implementation. For the continuing retail sales example, the container cardinality (containerCard)>maxCard*0.85→32,772>65,536*0.85→32,772>55,705.6→false. The maximum number of rows in a container can be an upper limit on the horizontal lines of entries in a table in an object that stores entities.

In response to a determination that run containers are being used, the roaringConvertCost function includes the query optimizer determining the conversion cost based on a run container run count, which is an experimentally validated small number of runs. For example, convertCost=run container run count (runContainerRunCount)=50. For the continuing retail sales example, the query optimizer does not calculate this value because run containers are not being used. A run container run count can be an experimentally validated number.

The roaringConvertCost function includes the query optimizer determining whether array containers are being used, based on the container cardinality. Array containers are used only in situations where the number of rows in the container is 4,096 or less. For the continuing retail sales example, containerCard≤4,096→32,772≤4,096→false.

In response to a determination that array containers are being used, the roaringConvertCost function includes the query optimizer determining the conversion cost based on the rows per value. For example, convertCost=rowsPerVal/2, which was determined empirically and reflects the fact that there is some cost per row when doing this conversion, but the cost is less than the bitmap container case. For the continuing retail sales example, the query optimizer does not calculate this value because array containers are not being used.

In response to a determination that bitmap containers are being used, the roaringConvertCost function includes the query optimizer determining the conversion cost based on the rows per value. For the continuing retail sales example, convertCost=rowsPerVal=101,692,059.8, which reflects the fact that there is some cost for each row, setting a bit in the bitmap, to convert each row individually when using a bitmap container.

The query optimizer determines an intersection cost based on the filter set container count, the filter set size, the dimension container count, and the rows per value. For the continuing retail sales example, the intersection cost (isectCost)=roaringIsectCost (filterSetContainerCnt, filterSetSize, dimContainerCnt, rowsPerVal)=roaringIsectCost (5,926, 388,381,289, 3,103, 101,692,059.8)=104,999,314. An intersection cost can be the expected expense of joining a converted row list with the filter set. The inputs to the roaringIsectCost function are: filterSetContainerCnt, which is the number of roaring containers used for the filter set, filterSetSize, which is the number of rows in the filter set, dimContainerCnt, which is the number of roaring containers used to represent the rows for each dimension value, and rowsPerVal, which is the expected number of rows per dimension value.

The roaringIsectCost function determines the average cost of intersecting the list of rows for a dimension value with the list of rows for the filter set. Since the query optimizer will be intersecting lists of rows, the query optimizer determines the list of rows that has the smallest number of containers, because each of these containers will be intersected with the counterpart list of rows to calculate the result.

The roaringIsectCost function includes the query optimizer determining whether the filter set container count is less than the dimension container count. In response to a determination that the filter set container count is less than the dimension container count, the roaringIsectCost function includes the query optimizer determining that the minimum container count is based on the filter set container count, the minimum container cardinality is based on the filter set size and the filter set container count, the maximum container count is based on the dimension container count, and the maximum container card is based on the rows per value and the dimension container count. In response to a determination that the filter set container count is not less than the dimension container count, the roaringIsectCost function includes the query optimizer determining that the minimum container count is based on the dimension container count, the minimum container cardinality is based on the rows per value and the minimum container count, the maximum container count is based on the filter set container count, and the maximum container card is based on the filter set size and the filter set container count. A minimum container count (minContainerCnt) can be the least number of objects that store entities. A minimum container cardinality (minContainerCard) can be the least number of rows per object that stores entities. A maximum container count (maxContainerCnt) can be the greatest number of objects that store entities. A maximum container cardinality (maxContainerCard) can be the greatest number of rows per object that stores entities.

The roaringIsectCost function calculates the following minimum and maximum values based on the inputs:

```
if filterSetContainerCnt < dimContainerCnt {
    minContainerCnt = filterSetContainerCnt
    minContainerCard = filterSetSize / filterSetContainerCnt
    maxContainerCnt = dimContainerCnt
    maxContainerCard = rowsPerVal / dimContainerCnt
} else {
    minContainerCnt = dimContainerCnt
    minContainerCard = rowsPerVal / minContainerCnt
    maxContainerCnt = filterSetContainerCnt
    maxContainerCard = filterSetSize / filterSetContainerCnt
}
```

Now the query optimizer has the container count range and the container cardinality range for both lists. For the continuing retail sales example,

```
if filterSetContainerCnt < dimContainerCnt → 5,926 < 3,103 → false,
then
    minContainerCnt = 3,103
    minContainerCard = 101,692,059.8 / 3,103 = 32,772
    maxContainerCnt = 5,926
    maxContainerCard = 388,381,289/5,926 =65,538.5.
```

The roaringIsectCost function includes the query optimizer determining the minimum container type and the maximum container type based on the minimum container cardinality, the maximum container cardinality, and the bitmap container maximum cardinality. The intersection cost depends primarily on the container type, and the container type is derived from the minimum and the maximum of the container cardinality, which is the number of rows that a container has on average. A minimum container type (minContainerType) can be a specific kind of object that stores entities for the least number of rows. A maximum container type (maxContainerType) can be a specific kind of object that stores entities for the greatest number of rows. A bitmap container maximum cardinality (bitmapContainerMaxCard) can be the greatest number of rows per specific type of object that stores entities in a relatively large number of rows.

maxContainerCard>bitmapContainerMaxCard*0.85→run container
minContainerCard>4,096→bitmap container
minContainerCard≤4,096→array container For the continuing retail sales example,
65,538.5>55,705.6→maxContainerType=run container
32,772>4,096→minContainerType=bitmap container The query optimizer determines the intersection cost based on the run container run count and the minimum container count, in response to a determination that the minimum container type is a run container and the maximum container type is a run container. The query optimizer determines the intersection cost based on the run container run count, the bitmap container maximum cardinality, the maximum container cardinality, and the minimum container count, in response to a determination that the minimum container type is a run container and the maximum container type is a bitmap container. The query optimizer determines the intersection cost based on the maximum container cardinality and the minimum container count, in response to a determination that the minimum container type is a run container and the maximum container type is an array container. The query optimizer determines the intersection cost based on the run container run count, the bitmap container maximum cardinality, the minimum container cardinality, and the minimum container count, in response to a determination that the minimum container type is a bitmap container and the maximum container type is a run container. The query optimizer determines the intersection cost based on the minimum container count, in response to a determination that the minimum container type is a bitmap container and the maximum container type is a bitmap container.

The query optimizer determines the intersection cost based on the maximum container cardinality and the minimum container count, in response to a determination that the minimum container type is a bitmap container and the maximum container type is an array container. The query optimizer determines the intersection cost based on the minimum container cardinality and the minimum container count, in response to a determination that the minimum container type is an array container and the maximum container type is a run container. The query optimizer determines the intersection cost based on the maximum container count, the minimum container cardinality, and the minimum container count, in response to a determination that the minimum container type is an array container and the maximum container type is a bitmap container. The query optimizer determines the intersection cost based on a combination of the minimum container cardinality and the maximum container cardinality, or a combination of the minimum container cardinality, the maximum container cardinality, and the minimum container count, in response to a determination that the minimum container type is an array container and the maximum container type is an array container. A combination can be a joining of different parts in which the component elements are individually distinct.

There are 9 possible cost functions because there are 9 possible container type combinations.

```
1) runContainer (minContainer)
    a) runContainer (maxContainer)
        i) cost = (runContainerRunCount + runContainerRunCount) * minContainerCnt
    b) bitmapContainer (maxContainer)
        i) cost = (1,024 + runContainerRunCount + (bitmapContainerMaxCard −
           maxContainerCard)) * minContainerCnt
    c) arrayContainer (maxContainer)
        i) cost = maxContainerCard * 2 * minContainerCnt
2) bitmapContainer (minContainer)
    a) runContainer (maxContainer)
        i) cost = (1,024 + runContainerRunCount + (bitmapContainerMaxCard −
           minContainerCard)) * minContainerCnt
    b) bitmapContainer (maxContainer)
        i) cost = 2 * 1,024 * minContainerCnt
    c) arrayContainer (maxContainer)
        i) cost = maxContainerCard * math.Max (1.0,
           math.Log10 (minContainerCnt)) * minContainerCnt
3) arrayContainer (minContainer)
    a) runContainer (maxContainer)
        i) cost = minContainerCard * 2 * minContainerCnt
    b) bitmapContainer (maxContainer)
        i) log = math.Log10 (maxContainerCnt)
        ii) cost = minContainerCard * log * minContainerCnt
    c) arrayContainer (maxContainer)
        i) if minContainerCard / 64.0 < maxContainerCard &
           maxContainerCard < 64.0 * minContainerCard
            (1) cost = minContainerCard + maxContainerCard
        ii) else
            (1) cost = math.Min (minContainerCard, maxContainerCard) *
                math.Log (math.Max (minContainerCard, maxContainerCard)) *
                minContainerCnt
```

For example, in case 1a), both containers are run containers, and the query optimizer can assume an average number of runs, such as 50, per container and derive the intersection cost by adding together the number of runs and multiplying this number of runs by the number of containers that are intersected. For the continuing retail sales example, based on the container types determined above, the query optimizer uses option 2a to calculate the intersection cost:

cost=(1,024+runContainerRunCount+(bitmapContainerMaxCard−minContainerCard))*minContainerCnt cost=(1,024+50+(65,536−32,772))*3,103=104,999,314

The query optimizer determines a match probability based on the filter set size and the dimension cardinality. The query optimizer calculates the probability that an intersection is non-empty. This is the probability, or expected value, that the list of rows for a dimension value contains a row in the filter set. For the continuing retail sales example, matchProb=filterSetSize/dimCard=388,381,289/52=7,468,870. A match probability (matchProb) can be the likelihood that an intersection is not empty.

The query optimizer adjusts the limit, which is the number of results needed by the XIL operator, based on other groupings in the query. The query optimizer determines an adjusted limit based on the limit, expected rows per key and upstream cardinalities. The query optimizer may reduce the limit if there are other groupings that will add rows to the result later on. The inputs to the adjustLimit function are limit, which is the maximum number of rows returned by the query, the expected rows per key (expectedRowsPerKey) which is the number of rows returned for each key, and upstream cardinalities (upstreamCard) which is the cross product of any further grouping dimension cardinalities. The query optimizer determines any adjusted value of the limit by dividing the initial value of the limit by the lesser of the expected rows per key and the upstream cardinalities. For the continuing retail sales example, adjLimit=adjustLimit (limit, expectedRowsPerKey, upstreamCard)=adjustLimit (10, 7,468,870, 1)=10. Since the upstream cardinalities is less than the expected rows per key and equals 1 in this example, the query optimizer divides the limit of 10 by the lesser value of 1 to result in the adjusted limit of 10, which is unchanged from the initial value of 10 for the limit.

The rationale for the adjustLimit function is that the XIL operator may be able to return fewer rows than are needed for the query, which can occur if there are additional grouping operators for other dimensions, or if the query projects the rows for grouping values, rather than collapsing them into an aggregate value. The query optimizer divides the limit by the lesser of either upstreamCard or expectedRowsPerKey to take into account the possibility that additional groupings may mean that the XIL operator can return fewer rows, or that rows will be projected later on when creating the final query result. A limit can be the maximum number of rows returned by a query. Expected rows per key can be the number of horizontal lines of entries in a table returned for each field in a record which is used to identify that record uniquely. Upstream cardinalities can be the cross product of any further grouping of the numbers of unique string values that occur. An adjusted limit can be the modified maximum number of rows returned by a query.

The query optimizer determines the adjusted match probability based on the match probability and the adjusted limit. This adjustment lowers the match probability to account for skew that is normally present in the data, and to ensure that the match probability is at most 1.

```
if limit < dimCard
    matchProb = limit / dimCard
if matchProb > 1.0
    matchProb = 1.0
```

For the continuing retail sales example,

```
if 10 < 52
    matchProb = 10 / 52 = 1,436,321
if matchProb > 1.0
    matchProb = 1.0
```

Setting the match probability to 1 means that based on the filter set size and the dimension cardinality, the query optimizer expects there to be a result for every dimension value. This expectation applies in the continuing retail sales example because the filter set is quite large (lots of rows match the filter) and the dimension cardinality is small (each value has lots of rows). Adjusted match probability (adjMatchProb) can be the modified likelihood that an intersection is not empty.

The query optimizer determines a number of intersection operations based on the dimension cardinality, the limit, and the adjusted match probability. The formula reflects the fact that the query optimizer cannot possibly do more intersections than there are values in the dimension. For the continuing retail sales example, isectCount=math.Min (dimCard, limit/adjMatchProb)=math.Min(52, 10/1)=10. For the continuing retail sales example, the query optimizer calculates that 10 intersections are required because the query needs 10 elements and the query optimizer expects each intersection to yield a result. A number of intersection operations (isectCount) can be an estimated count of actions to identify the overlap between a filter set with a set of rows for each dimension value.

The query optimizer determines a grouping operator cost based on the number of intersection operations, the intersection cost, and the conversion cost, which is basically the number of intersections multiplied by the total cost for each intersection. For the continuing retail sales example, grouping operator cost (xilCost)=isectCount*(isectCost+convertCost)=10*(104,999,314+101,692,059.8)=2,066,913,738. This is the estimated cost of the XIL operator, represented as a number of operations. For the continuing retail sales example, the query optimizer determines that the XIL operator needs to perform 10 relatively expensive intersection operations in order to compute the result that the query requires, because the limit is 10, each intersection operation is expected to yield a result, and each intersection is fairly expensive because the sizes of the operands is big. A grouping operator cost (xilCost) can be an estimated number of operations for a query.

The query optimizer determines an adjusted grouping operator cost based on the grouping operator cost and an available worker count if the intersections may be done in parallel. The asynchronous speedup factor (asyncSpeedupFactor) is a fudge factor introduced to make the formulae reflect actual observed costs. The constant qg optimal asynchronous level (qgOpt.AsyncLevel) is currently set to 8. The available worker count [AvailableWorkerCount( )] is the number of asynchronous threads that the operator is allowed to use, determined by an implementation specific policy. An adjusted grouping operator cost (xilCost) can be an estimated number of operations for a query.

```
if useparallelism( ) || useOrderedParallelism( )
    asyncLevel = qgOpt.AsyncLevel
    if asyncLevel < AvailableWorkerCount( ) {
        asyncLevel = AvailableWorkerCount( )
        asyncSpeedupFactor = 2.0
    if useOrderedAsyncWorkers( )
        asyncSpeedupFactor = 0.18
    xilCost = xilCost / (float64(asyncLevel) * asyncSpeedupFactor)
```

The query optimizer can adjust the estimated grouping operator cost based on whether or not the intersections will be done in parallel. For the continuing retail sales example, the query optimizer decides to use parallelism and needs to guarantee order, and the cost function is based on parallelism yielding a 44% increase in speed. The estimate for the increase in speed is low because of the need to maintain order, which has some overhead. For the continuing retail sales example, the final estimated cost for the XIL operator is xilCost=xilCost/1.44)=1,435,356,762.5. An available worker count can be the number of asynchronous threads that an operator is allowed to use.

The calculations for the XIDI operator are similar to the calculations for the XIL operator, except that an index is used to process the dimension, which avoids intersecting. Therefore, the query optimizer estimates the cost for the XIDI operator by iterating through the filter set and looking up each row in the filter set in the index to determine the dimension value. The query optimizer constructs an intermediate map which maps the dimension values to the set of rows matched for that value. The query optimizer sorts the key values in the intermediate map and uses the sorted key values to look up the set of rows for each key to produce the output. The XIDI operator might appear to always execute faster, but since the entire filter set must be processed before any output may be produced, the XIDI operator can sometimes execute slower than doing intersections using the XIL operator, especially if the limit is small. In that case, the query optimizer processes the entire filter set to produce a potentially large number of output elements, most of which are not needed.

When the query optimizer estimates the costs for the XIDI operator, the costs are represented as a generic number of operations that must be performed by the computer executing the query. The input values include filterSetSize, which is the number of rows in the filter set, dsSize, which is the number of rows in the data set, and dmCard, which is the number of unique values in the dimension, and the output is the value xidiCost.

The example for the XIDI operator continues the previous retail sales example for the XIL operator. The inputs to the cost function for this retail sales example are still: filterSetSize=388,381,289 (the number of transactions during 2018), dsSize=5,287,987,111 (the number of transactions/rows in the database), and dmCard=52 (the number of unique weeks). The constants hashing cost factor (HashCostFactor)=1.5 and fast map cost factor (FastMapCostFactor)=1.0 are defined based on actual measurements.

The query optimizer estimates the cost of the following alternative query plan, which is the same plan is as before, except the XIL operator is replaced with the XIDI operator.

```
QG.Row_range(
  QG.Rows_agg_inv(
    QG.Map_groups_inv(
      QG.Cross_isect_Dim_Index(
        QG.Flatten (
          QG.Dimension_data("sales", "year", range("2018", "2018"))),
        QG.Dimension_data("sales", "week"))
```

The query optimizer determines a record set adding cost factor based on a filter set size. The constant used in the formula was determined by experimentation. For the continuing retail sales example, recordSetAddCostFactor=float64 (filterSetSize)*4.0e-9=388,381,289*4.0e-9=15.5. A record set adding cost factor (recordSetAddCostFactor) can be an expense of appending a row to a group of information items that is being built for output.

The query optimizer determines rows per key based on a data set size and a dimension cardinality. For the continuing retail sales example, rowsPerKey=dsSize/dimCard=5,287,987,111/52=101,692,059.8. Rows per key (rowsPerKey) can be the number of expected horizontal lines of entries in a table for each dimension value.

The query optimizer determines unique keys based on the dimension cardinality, the data set size, and the filter set size. The percentage of dimension values selected is assumed to be the same as the percentage of rows selected by the filter set. For the continuing retail sales example, uniqueKeys=dimCard/(dsSize/filterSetSize)=52/(5,287,987,111/388,381,289)=3.8. Unique keys (uniqueKeys) can be the number of expected dimension values in the output.

The query optimizer determines whether the unique keys is greater than a maximum slice size. For the continuing retail sales example, uniqueKeys>MaxSliceSize→3.8>16 million→false. 16 million is used for as a reasonable size for an array that fits in memory. A maximum slice size (MaxSliceSize) can be the magnitude of an array that fits in memory In response to a determination that the number of unique keys is greater than the maximum slice size, the query optimizer determines a hashing cost based on the unique keys, the maximum slice size, the rows per key, the record set adding cost factor, a hashing cost factor and a fast map cost factor.

```
If uniqueKeys > MaxSliceSize = true, then
  collCost = (uniqueKeys − MaxSliceSize) * rowsPerKey *
    (HashCostFactor +
      recordSetAddCostFactor)
  fastmapPrimaryCost = MaxSliceSize * rowsPerKey *
    (FastMapCostFactor +
      recordSetAddCostFactor)
  hashCost = fastmapPrimaryCost + collCost
```

Two components of the hashing cost above reflect the cost for using an array for some of the values and using a regular map for the rest of the values. MaxSliceSize is the size of the array. For the continuing retail sales example, the query optimizer does not determine the hashing cost because uniqueKeys>MaxSliceSize→3.8>16 million→false. Hashing cost (hashCost) can be the expense of processing elements in the filter set.

In response to a determination that the number of unique keys is not greater than the maximum slice size. the query optimizer determines the hashing cost based on the record set adding cost factor, the filter set size, and the fast map cost factor.

If uniqueKeys>MaxSliceSize=false, then hashCost=(FastMapCostFactor+recordSetAddCostFactor)*filterSetSize.

The formula reflects the fact that each element in the filter set is processed and has the same cost. The cost has two parts, the cost of inserting an element in the map and later looking up the element, and the cost of inserting an element in the output record set. FastMapCostFactor=1.0 reflects the fact that the query optimizer can use an array to simulate a map in this case, and the array has a cheaper cost for access. For the continuing retail sales example, hashCost=(FastMapCostFactor+recordSetAddCostFactor)*filterSetSize=(1+15.5)*388,381,289=6,408,291,268.5.

The query optimizer determines a sorting cost based on the unique keys. For the continuing retail sales example, sortCost=uniqueKeys*Log 2 (uniqueKeys)=3.8*1.92=7.296. A sorting cost (sortCost) can be an expense of systematically arranging output keys into groups.

The query optimizer determines a total cost based on the hashing cost and the sorting cost. For the continuing retail sales example, xidiCost=hashCost+sortCost=6,408,291, 268.5+7.296=6,408,291,275.796. In the continuing retail sales example, the final estimated cost for the XIDI operator is significantly higher than the estimated cost for the XIL operator because the relatively small limit which limited the number of intersections that the XIL operator had to perform caused the XIL operator to have a lower estimated cost than the XIDI operator, which had to look up the entire filter set in the index. For the continuing retail sales example, the query optimizer's final determination is that since xi/Cost<xidiCost→use the XIL operator.

Following the estimations of the resource costs, a grouping operator is selected during query runtime, based on a corresponding resource cost, from the multiple grouping operators, block 106. The system selects the optimal grouping operator for the query. In embodiments, this can include the query optimizer selecting the XIL operator during query runtime, based on the lower estimate of 1.435 billion operations, as described above in detail.

Having selected a grouping operator, the selected grouping operator enables grouping the data stream based on the query request, block 108. The system-selected grouping operator optimally groups the data stream. For example, and without limitation, this can include the selected XIL operator optimally grouping the data stream from the global online retail sales database.

After grouping the data stream, the selected grouping operator enables outputting a response based on the grouped data stream, block 110. The system-selected grouping operator outputs the optimally grouped data stream. By way of example and without limitation, this can include the selected XIL operator optimally outputting a response based on the grouped transactions during the first 10 weeks of the year 2018. A response can be a reply to a request to retrieve information.

The method 100 may be repeated as desired. Although this disclosure describes the blocks 102-110 executing in a particular order, the blocks 102-110 may be executed in a different order. In other implementations, each of the blocks 102-110 may also be executed in combination with other blocks and/or some blocks may be divided into a different set of blocks.

There are three possible optimization decisions that the query engine can implement. The all rows optimization converts the grouping operator to a dimension scan operator when the child row set contains all of the rows in the data set. In this case, the grouping operator is redundant. This optimization takes advantage of the fact that dimensions are stored as inverted indexes sorted by dimension value. Thus, each element in a dimension has the form: ([dimKey], [row1, row2, . . . ]) and all that is needed is to return the dimension elements themselves. This optimization recognizes that there are times when a query filter selects all of the rows in the data set, which is easily overlooked.

Another optimization converts from the XIDI operator to the XIL operator to perform the grouping, which is triggered by the cost model. This switch is performed whenever the XIL operator is predicted to have lower cost. This optimization typically is performed when the limit is small, and the filter set is large. In this case, the XIL operator will only have to perform a small number of intersections, while the XIDI operator has to process the entire filter set before any output may be produced. If parallel execution is allowed (there are several thresholds need to be satisfied) then yet another optimization may convert the XIDI operator to a parallel version of the XIL operator which leverages multiple threads to perform the XIL operator in parallel, further reducing the execution time.

System Overview

Figure 2:
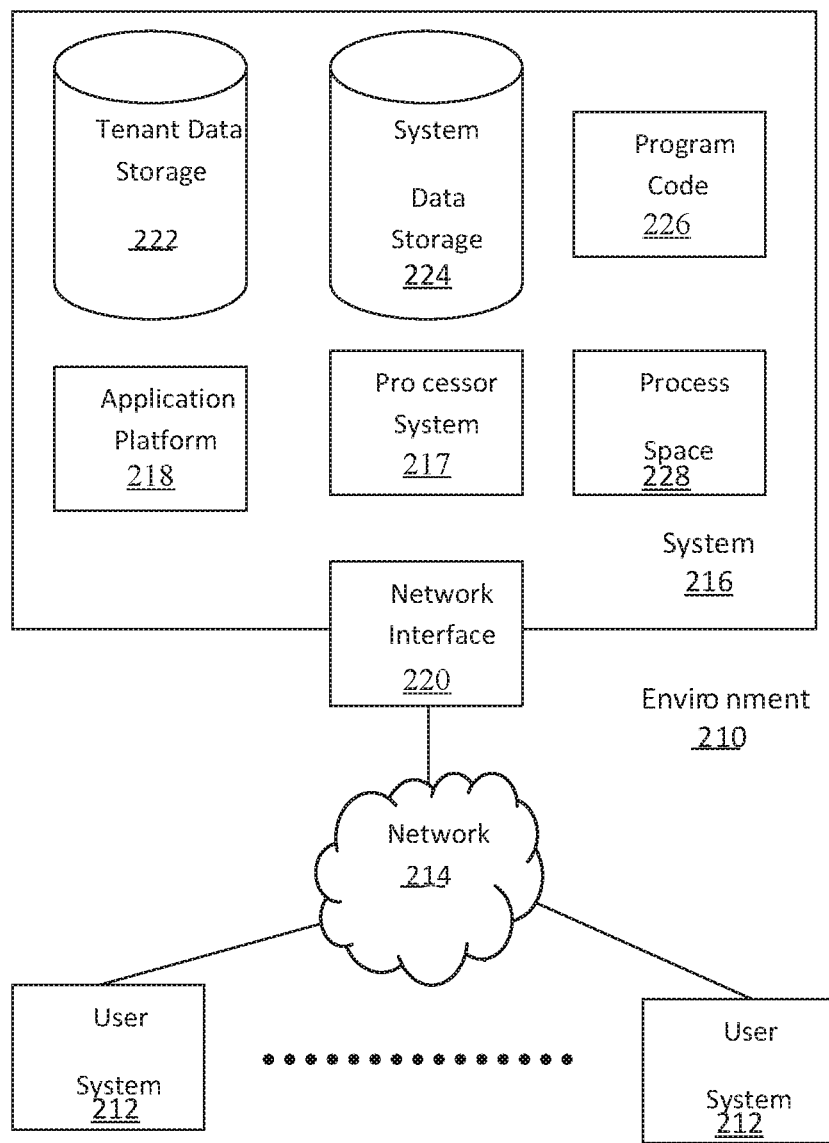
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 3:
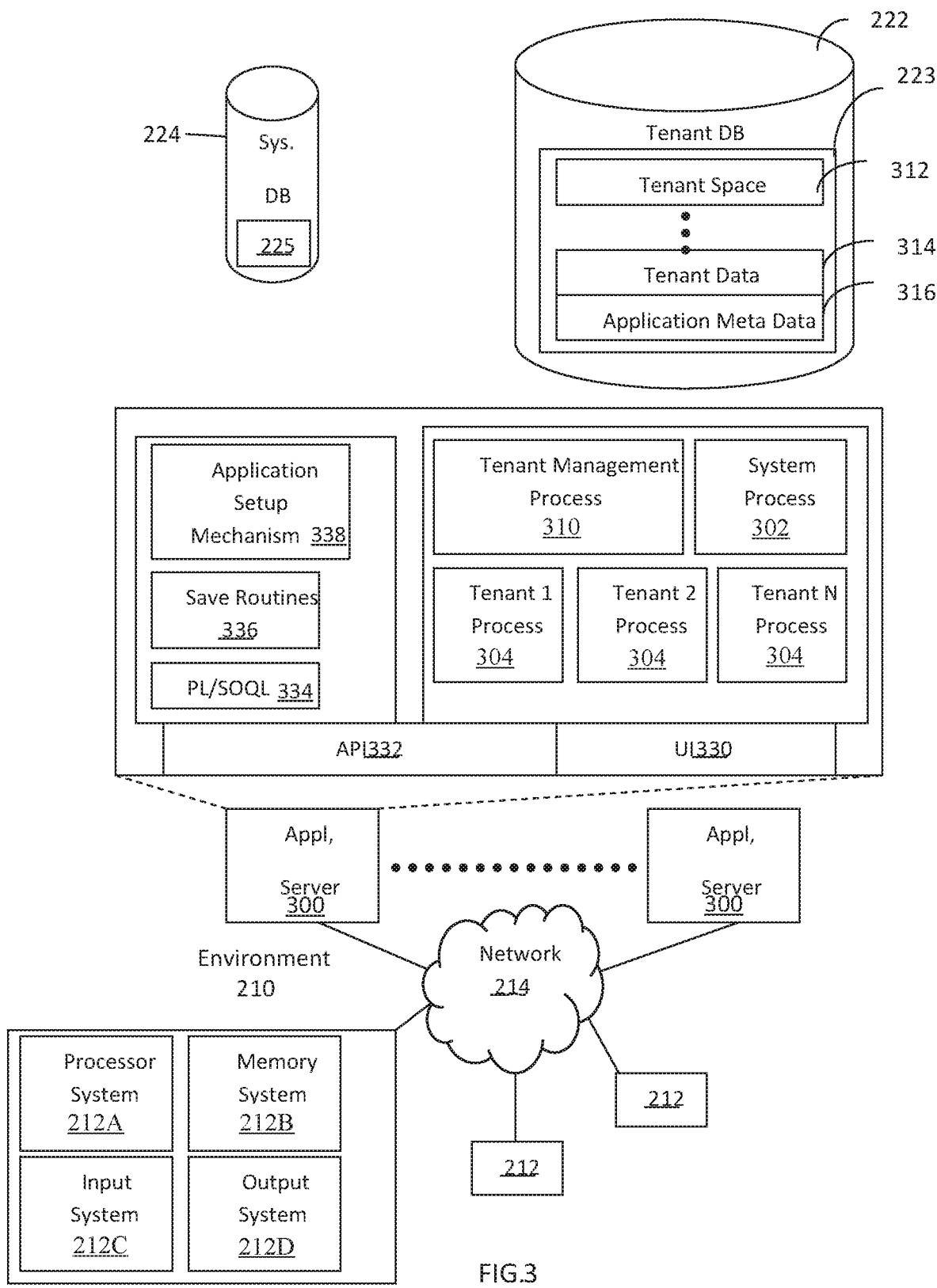
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers 3001-300N, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which may be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server 300i might be coupled via the network 214 (e.g., the Internet), another application server 300N-1 might be coupled via a direct network link, and another application server 300N might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also may be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for runtime optimization of grouping operators, comprising:
   one or more processors; and
   a non-transitory computer readable medium storing a plurality of instructions, which when executed, cause the one or more processors to:
   estimate a resource cost for each of a plurality of alternative grouping operators which group a stream of inverted data for a corresponding plurality of alternative query plans, based on values identified during query runtime, in response to receiving a query request associated with the stream of inverted data, each of the alternative grouping operators refining an existing grouping of the data stream by adding an additional level of grouping, the plurality of alternative grouping operators comprising a cross intersection left operator and a cross intersection dimension index operator;
   select an alternative grouping operator during query runtime, based on a corresponding resource cost from the plurality of alternative grouping operators; and enable, by the selected alternative grouping operator and a corresponding alternative query plan, grouping the data stream based on the query request and outputting a response based on the grouped data stream.

2. The system of claim 1, wherein the resource cost comprises a number of executed operations.

3. The system of claim 1, wherein estimating the resource cost comprises:
determining rows per value based on a data set size and a dimension cardinality;
determining a filter set container count based on a container size and a number of containers for a left child;
using sampling to estimate a dimension container count;
determining a conversion cost based on at least two of the rows per value, the dimension container count, a container cardinality, and a run container run count;
determining an intersection cost based on the filter set container count, a filter set size, the dimension container count, and the rows per value;
determining a match probability based on the filter set size and the dimension cardinality;
determining an adjusted limit based on a limit, expected rows per key, and upstream cardinalities;
determining an adjusted match probability based on the match probability and the adjusted limit;
determining a number of intersection operations based on the dimension cardinality, the adjusted limit, and the adjusted match probability;
determining a grouping operator cost based on the number of intersection operations, the intersection cost, and the conversion cost; and
determining an adjusted grouping operator cost based on the grouping operator cost and an available worker count.

4. The system of claim 3, wherein determining the conversion cost comprises:
using the rows per value and the dimension container count to determine whether run containers, array containers, or bitmap containers are being used;
determining the conversion cost based on the run container run count, in response to a determination that run containers are being used;
determining the conversion cost based on the rows per value in response to a determination that array containers are being used; and
determining the conversion cost based on the rows per value, in response to a determination that bitmap containers are being used.

5. The system of claim 3, wherein determining the intersection cost comprises:
determining whether the filter set container count is less than the dimension container count;
a minimum container count comprising the filter set container count, a minimum container cardinality being based on the filter set size and the filter set container count, a maximum container count comprising the dimension container count, and a maximum container cardinality being based on the rows per value and the dimension container count, in response to a determination that the filter set container count is less than the dimension container count;
the minimum container count comprising the dimension container count, the minimum container cardinality being based on the rows per value and the minimum container count, the maximum container count comprising the filter set container count, and the maximum container cardinality being based on the filter set size and the filter set container count, in response to a determination that the filter set container count is not less than the dimension container count; and
determining a minimum container type and a maximum container type based on the minimum container cardinality, the maximum container cardinality, and a bitmap container maximum cardinality.

6. The system of claim 5, wherein the intersection cost is based on one of:
the run container run count and the minimum container count, in response to a determination that the minimum container type is a run container and the maximum container type is the run container;
the run container run count, the bitmap container maximum cardinality, the maximum container cardinality, and the minimum container count, in response to a determination that the minimum container type is the run container and the maximum container type is a bitmap container;
the maximum container cardinality and the minimum container count, in response to a determination that the minimum container type is the run container and the maximum container type is an array container;
the run container run count, the bitmap container maximum cardinality, the minimum container cardinality, and the minimum container count, in response to a determination that the minimum container type is a bitmap container and the maximum container type is the run container;
the minimum container count, in response to a determination that the minimum container type is the bitmap container and the maximum container type is the bitmap container;
the maximum container cardinality and the minimum container count, in response to a determination that the minimum container type is the bitmap container and the maximum container type is the array container;
the minimum container cardinality and the minimum container count, in response to a determination that the minimum container type is the array container and the maximum container type is the run container:
the maximum container count, the minimum container cardinality, and the minimum container count, in response to a determination that the minimum container type is the array container and the maximum container type is the bitmap container; or
a combination of the minimum container cardinality and the maximum container cardinality, or a combination of the minimum container cardinality, the maximum container cardinality, and the minimum container count, in response to a determination that the minimum container type is the array container and the maximum container type is the array container.

7. The system of claim 1, wherein estimating the resource cost comprises:
determining a record set adding cost factor based on a filter set size;
determining rows per key based on a data set size and a dimension cardinality;
determining unique keys based on the dimension cardinality, the data set size, and the filter set size;
determining whether the unique keys is greater than a maximum slice size;
determining a hashing cost based on the unique keys, the maximum slice size, the rows per key, the record set adding cost factor, a hashing cost factor and a fast map cost factor, in response to a determination that the unique keys is greater than the maximum slice size;

determining the hashing cost based on the record set adding cost factor, the filter set size, and the fast map cost factor, in response to a determination that the unique keys is not greater than the maximum slice size;

determining a sorting cost based on the unique keys; and determining a total cost based on the hashing cost and the sorting cost.

8. A computer program product comprising computer-readable program code to be executed by one or more processors when retrieved from a non-transitory computer-readable medium, the program code including instructions to:

estimate a resource cost for each of a plurality of alternative grouping operators which group a stream of inverted data for a corresponding plurality of alternative query plans, based on values identified during query runtime, in response to receiving a query request associated with a the stream of inverted data, each of the alternative grouping operators refining an existing grouping of the data stream by adding an additional level of grouping, the plurality of alternative grouping operators comprising a cross intersection left operator and a cross intersection dimension index operator;

select an alternative grouping operator during query runtime, based on a corresponding resource cost from the plurality of alternative grouping operators; and enable, by the selected alternative grouping operator and a corresponding alternative query plan, grouping the data stream based on the query request and outputting a response based on the grouped data stream.

9. The computer program product of claim 8, wherein the resource cost comprises a number of executed operations.

10. The computer program product of claim 8, wherein estimating the resource cost comprises:

determining rows per value based on a data set size and a dimension cardinality;

determining a filter set container count based on a container size and a number of containers for a left child;

using sampling to estimate a dimension container count;

determining a conversion cost based on at least two of the rows per value, the dimension container count, a container cardinality, and a run container run count;

determining an intersection cost based on the filter set container count, a filter set size, the dimension container count, and the rows per value;

determining a match probability based on the filter set size and the dimension cardinality;

determining an adjusted limit based on a limit, expected rows per key, and upstream cardinalities;

determining an adjusted match probability based on the match probability and the adjusted limit;

determining a number of intersection operations based on the dimension cardinality, the adjusted limit, and the adjusted match probability;

determining a grouping operator cost based on the number of intersection operations, the intersection cost, and the conversion cost; and determining an adjusted grouping operator cost based on the grouping operator cost and an available worker count.

11. The computer program product of claim 10, wherein determining the conversion cost comprises:

using the rows per value and the dimension container count to determine whether run containers, array containers, or bitmap containers are being used;

determining the conversion cost based on the run container run count, in response to a determination that run containers are being used;

determining the conversion cost based on the rows per value in response to a determination that array containers are being used; and determining the conversion cost based on the rows per value, in response to a determination that bitmap containers are being used.

12. The computer program product of claim 10, wherein determining the intersection cost comprises:

determining whether the filter set container count is less than the dimension container count;

a minimum container count comprising the filter set container count, a minimum container cardinality being based on the filter set size and the filter set container count, a maximum container count comprising the dimension container count, and a maximum container cardinality being based on the rows per value and the dimension container count, in response to a determination that the filter set container count is less than the dimension container count;

the minimum container count comprising the dimension container count, the minimum container cardinality being based on the rows per value and the minimum container count, the maximum container count comprising the filter set container count, and the maximum container cardinality being based on the filter set size and the filter set container count, in response to a determination that the filter set container count is not less than the dimension container count; and determining a minimum container type and a maximum container type based on the minimum container cardinality, the maximum container cardinality, and a bitmap container maximum cardinality, wherein the intersection cost is based on one of:

the run container run count and the minimum container count, in response to a determination that the minimum container type is a run container and the maximum container type is the run container;

the run container run count, the bitmap container maximum cardinality, the maximum container cardinality, and the minimum container count, in response to a determination that the minimum container type is the run container and the maximum container type is a bitmap container;

the maximum container cardinality and the minimum container count, in response to a determination that the minimum container type is the run container and the maximum container type is an array container;

the run container run count, the bitmap container maximum cardinality, the minimum container cardinality, and the minimum container count, in response to a determination that the minimum container type is a bitmap container and the maximum container type is the run container;

the minimum container count, in response to a determination that the minimum container type is the bitmap container and the maximum container type is the bitmap container;

the maximum container cardinality and the minimum container count, in response to a determination that the minimum container type is the bitmap container and the maximum container type is the array container;

the minimum container cardinality and the minimum container count, in response to a determination that the minimum container type is the array container and the maximum container type is the run container:

the maximum container count, the minimum container cardinality, and the minimum container count, in response to a determination that the minimum container type is the array container and the maximum container type is the bitmap container; or a combination of the minimum container cardinality and the maximum container cardinality, or a combination of the minimum container cardinality, the maximum container cardinality, and the minimum container count, in response to a determination that the minimum container type is the array container and the maximum container type is the array container.

13. The computer program product of claim 8, wherein estimating the resource cost comprises:

determining a record set adding cost factor based on a filter set size;

determining rows per key based on a data set size and a dimension cardinality;

determining unique keys based on the dimension cardinality, the data set size, and the filter set size;

determining whether the unique keys is greater than a maximum slice size;

determining a hashing cost based on the unique keys, the maximum slice size, the rows per key, the record set adding cost factor, a hashing cost factor and a fast map cost factor, in response to a determination that the unique keys is greater than the maximum slice size;

determining the hashing cost based on the record set adding cost factor, the filter set size, and the fast map cost factor, in response to a determination that the unique keys is not greater than the maximum slice size;

determining a sorting cost based on the unique keys; and determining a total cost based on the hashing cost and the sorting cost.

14. A method for runtime optimization of grouping operators, comprising:

receiving a query request associated with a stream of inverted data;

estimating, in response to receiving the query request, a resource cost for each of a plurality of alternative grouping operators which group the stream of inverted data for a corresponding plurality of alternative query plans, based on values identified during query runtime, each of the alternative grouping operators refining an existing grouping of the data stream by adding an additional level of grouping, the plurality of alternative grouping operators comprising a cross intersection left operator and a cross intersection dimension index operator;

selecting, from the plurality of alternative grouping operators, an alternative grouping operator during query runtime based on a corresponding resource cost; and enabling, by the selected alternative grouping operator and a corresponding alternative query plan, grouping the data stream based on the query request and outputting a response based on the grouped data stream.

15. The method of claim 14, wherein the resource cost comprises a number of executed operations.

16. The method of claim 14, wherein estimating the resource cost comprises:

determining rows per value based on a data set size and a dimension cardinality;

determining a filter set container count based on a container size and a number of containers for a left child;

using sampling to estimate a dimension container count;

determining a conversion cost based on at least two of the rows per value, the dimension container count, a container cardinality, and a run container run count;

determining an intersection cost based on the filter set container count, a filter set size, the dimension container count, and the rows per value;

determining a match probability based on the filter set size and the dimension cardinality;

determining an adjusted limit based on a limit, expected rows per key, and upstream cardinalities;

determining an adjusted match probability based on the match probability and the adjusted limit;

determining a number of intersection operations based on the dimension cardinality, the adjusted limit, and the adjusted match probability;

determining a grouping operator cost based on the number of intersection operations, the intersection cost, and the conversion cost; and determining an adjusted grouping operator cost based on the grouping operator cost and an available worker count.

17. The method of claim 16, wherein determining the conversion cost comprises:

using the rows per value and the dimension container count to determine whether run containers, array containers, or bitmap containers are being used;

determining the conversion cost based on the run container run count, in response to a determination that run containers are being used;

determining the conversion cost based on the rows per value in response to a determination that array containers are being used; and determining the conversion cost based on the rows per value, in response to a determination that bitmap containers are being used.

18. The method of claim 16, wherein determining the intersection cost comprises:

determining whether the filter set container count is less than the dimension container count;

a minimum container count comprising the filter set container count, a minimum container cardinality being based on the filter set size and the filter set container count, a maximum container count comprising the dimension container count, and a maximum container cardinality being based on the rows per value and the dimension container count, in response to a determination that the filter set container count is less than the dimension container count;

the minimum container count comprising the dimension container count, the minimum container cardinality being based on the rows per value and the minimum container count, the maximum container count comprising the filter set container count, and the maximum container cardinality being based on the filter set size and the filter set container count, in response to a determination that the filter set container count is not less than the dimension container count; and determining a minimum container type and a maximum container type based on the minimum container cardinality, the maximum container cardinality, and a bitmap container maximum cardinality.

19. The method of claim 18, wherein the intersection cost is based on one of:

the run container run count and the minimum container count, in response to a determination that the minimum container type is a run container and the maximum container type is the run container;

the run container run count, the bitmap container maximum cardinality, the maximum container cardinality, and the minimum container count, in response to a determination that the minimum container type is the run container and the maximum container type is a bitmap container;

the maximum container cardinality and the minimum container count, in response to a determination that the minimum container type is the run container and the maximum container type is an array container;

the run container run count, the bitmap container maximum cardinality, the minimum container cardinality, and the minimum container count, in response to a determination that the minimum container type is a bitmap container and the maximum container type is the run container;

the minimum container count, in response to a determination that the minimum container type is the bitmap container and the maximum container type is the bitmap container;

the maximum container cardinality and the minimum container count, in response to a determination that the minimum container type is the bitmap container and the maximum container type is the array container;

the minimum container cardinality and the minimum container count, in response to a determination that the minimum container type is the array container and the maximum container type is the run container:

the maximum container count, the minimum container cardinality, and the minimum container count, in response to a determination that the minimum container type is the array container and the maximum container type is the bitmap container; or a combination of the minimum container cardinality and the maximum container cardinality, or a combination of the minimum container cardinality, the maximum container cardinality, and the minimum container count, in response to a determination that the minimum container type is the array container and the maximum container type is the array container.

20. The method of claim 14, wherein estimating the resource cost comprises:
    determining a record set adding cost factor based on a filter set size;
    determining rows per key based on a data set size and a dimension cardinality;
    determining unique keys based on the dimension cardinality, the data set size, and the filter set size;
    determining whether the unique keys is greater than a maximum slice size;
    determining a hashing cost based on the unique keys, the maximum slice size, the rows per key, the record set adding cost factor, a hashing cost factor and a fast map cost factor, in response to a determination that the unique keys is greater than the maximum slice size;
    determining the hashing cost based on the record set adding cost factor, the filter set size, and the fast map cost factor, in response to a determination that the unique keys is not greater than the maximum slice size;
    determining a sorting cost based on the unique keys; and
    determining a total cost based on the hashing cost and the sorting cost.

* * * * *